(12) United States Patent
Nagata (10) Patent No.: US 9,450,215 B2
(45) Date of Patent: Sep. 20, 2016

(54) OUTER CASING MATERIAL FOR BATTERY AND LITHIUM SECONDARY BATTERY

(75) Inventor: Kensuke Nagata, Hikone (JP)

(73) Assignee: Showa Denko Packaging Co., Ltd., Kanagawa-ken (JP)

(*) Notice: Subject to any disclaimer, the term of this patent is extended or adjusted under 35 U.S.C. 154(b) by 712 days.

(21) Appl. No.: 13/601,870

(22) Filed: Aug. 31, 2012

(65) Prior Publication Data

US 2013/0236773 A1    Sep. 12, 2013

(30) Foreign Application Priority Data

Sep. 1, 2011    (JP) ................. 2011-190533

(51) Int. Cl.
*H01M 2/04*    (2006.01)
*H01M 2/02*    (2006.01)

(52) U.S. Cl.
CPC .......... *H01M 2/024* (2013.01); *H01M 2/0277* (2013.01); *H01M 2/0285* (2013.01); *H01M 2/0287* (2013.01); *H01M 2/021* (2013.01); *H01M 2/0275* (2013.01); *H01M 2002/0297* (2013.01)

(58) Field of Classification Search
CPC .......... H01M 2/0297; H01M 2/0287; H01M 2/0277; H01M 2/0267; H01M 2/0275
See application file for complete search history.

(56) References Cited

U.S. PATENT DOCUMENTS

2002/0142178 A1* 10/2002 Yamashita et al. ............ 428/461
2003/0180609 A1*  9/2003 Yamashita et al. ............ 429/185
2010/0221601 A1*  9/2010 Fukuda ......................... 429/185

FOREIGN PATENT DOCUMENTS

| JP | 2003-007261 A | 1/2003 |
|---|---|---|
| JP | 2003-007267 A | 1/2003 |
| JP | 2003-007268 A | 1/2003 |
| JP | 2006-305869 A | 11/2006 |
| JP | 2008-243439 | 10/2008 |
| JP | 2009-061670 A | 3/2009 |
| JP | 2009-238475 A | 10/2009 |
| JP | 4431822 | 3/2010 |
| JP | 2011-023575 A | 2/2011 |
| JP | 2011-079152 A | 4/2011 |
| JP | 2012-014915 A | 1/2012 |
| JP | 2012-134049 A | 7/2012 |
| JP | 2012-238455 A | 12/2012 |
| JP | 2012-238516 A | 12/2012 |
| JP | 5755975 B2 | 7/2015 |

OTHER PUBLICATIONS

Office Action in JP 2011-190533 dated Feb. 3, 2015.
Office Notification (Information Statement) for JP 2015-114314 mailed May 17, 2016.
Office Action for Japanese Application No. JP 2015-114314 mailed Jun. 21, 2016.

* cited by examiner

*Primary Examiner* — Gary Harris
(74) *Attorney, Agent, or Firm* — Nixon Peabody LLP; Khaled Shami (57) ABSTRACT

An outer casing material for a battery is provided which is constituted by laminating an outer layer that includes a heat-resistant resin film, a metal foil layer, and an inner layer that includes a thermoplastic resin film, wherein a melt flow rate of the inner layer is in a range of greater than or equal to 1 and less than 10.

19 Claims, 4 Drawing Sheets

INJECTION OF ELECTROLYTE

OUTER CASING MATERIAL FOR BATTERY AND LITHIUM SECONDARY BATTERY

CROSS REFERENCE TO RELATED APPLICATIONS OR PRIORITY CLAIM

This application claims priority of Japanese Patent Application No. 2011-190533, filed on Sep. 1, 2011, the content of which is incorporated herein by reference.

BACKGROUND OF THE INVENTION

1. Field of the Invention

The present invention relates to an outer casing material for a battery and a lithium secondary battery.

2. Description of Related Art

With increasing portability and reduction in size of electronic apparatuses such as video cameras, laptop personal computers, and mobile phones, requests for a reduction in size and weight have also increased for a battery that is a drive source thereof, and as a result, high-performance lithium secondary batteries have become widely used. In recent years, in order to utilize a lithium secondary battery as an in-vehicle power supply of an electric or hybrid vehicle, scaling up the size of the lithium secondary battery has been studied.

However, there is a limit to a mounting space for an in-vehicle power supply in a vehicle and the shape of the mounting space is also not constant. For this reason, similarly to the case of the electronic apparatus or the like, freedom of shape, size reduction (a reduction in thickness) and reduction in weight are required for an in-vehicle lithium secondary battery. As an outer casing material of such a lithium secondary battery, a packaging container as disclosed in, for example, the following Patent Literature 1 is known. The packaging container of Patent Literature 1 is constituted by laminating an outer layer made of a resin layer, aluminum foil, and an inner layer made of a resin layer, and heat-sealing properties are given to the resin layer of the inner layer. By inserting a cell into such a packaging container and heat-sealing the inner layers, a lithium secondary battery having an excellent degree of freedom of shape and hermetic sealing properties is obtained.

Further, since the in-vehicle lithium secondary battery has a large size compared to a lithium secondary battery for the electronic apparatus and the amount of current used is large, excellent insulation performance is required for an outer casing material thereof. In the following Patent Literature 2, as means for evaluating insulation performance, an abnormality detection device of a battery which detects defects of an inner surface resin layer of a battery outer casing material is disclosed.

However, the insulation performance of an outer casing material for a battery in the related art is still insufficient and further improvement is required.

CONVENTIONAL ART LITERATURE

Patent Literature

Patent Literature 1: Japanese Patent No. 4431822
Patent Literature 2: Japanese Unexamined Patent Application, First Publication No. 2008-243439

SUMMARY OF THE INVENTION

The present invention has been made in view of the above-described circumstances and has an object of providing an outer casing material for a battery having excellent insulation properties and a lithium secondary battery provided with such an outer casing material for a battery.

[1] According to an aspect of the invention, an outer casing material for a battery is provided, wherein the casing material is constituted by laminating an outer layer which includes a heat-resistant resin film, a metal foil layer, and an inner layer which includes a thermoplastic resin film, and a melt flow rate (MFR) of the inner layer is in a range of greater than or equal to 1 and less than 10.

[2] In the outer casing material for a battery according to the above [1], the thickness of the inner layer may be in a range of 0.1 µm to 200 µm.

[3] In the outer casing material for a battery according to the above [1] or [2], the inner layer may be made of polyolefin.

[4] In the outer casing material for a battery according to any one of the above [1] to [3], the inner layer may be composed of an intermediate layer and a pair of covering layers laminated on both sides in the thickness direction of the intermediate layer so that the intermediate layer is sandwiched by the covering layers, and a melt flow rate of the covering layer may be higher than a melt flow rate of the intermediate layer.

[5] In the outer casing material for a battery according to any one of the above [1] to [4], the melt flow rate (MFR) of the inner layer may be in a range of 1 to 5.

[6] In the outer casing material for a battery according to any one of the above [1] to [5], the thickness of the inner layer may be in a range of 50 µm to 100 µm.

[7] In the outer casing material for a battery according to any one of the above [1] to [6], the outer layer and the inner layer may be bonded to the metal foil layer through adhesive layers.

[8] In the outer casing material for a battery according to any one of the above [1] to [7], a concave portion may be formed by deep drawing or bulging.

[9] According to another aspect of the invention, a lithium secondary battery is provided having the outer casing material for a battery according to any one of the above [1] to [8].

DETAILED DESCRIPTION OF THE INVENTION

Preferred examples of the present invention will be described below. However, the present invention is not limited to these examples. Addition, omission, substitution, and other changes of a configuration can be made within a scope which does not depart from the gist of the present invention. The present invention is not limited by the following description, but is limited only by the scope of the appended claims.

Hereinafter, a description will be made with respect to an outer casing material for a battery and a lithium secondary battery provided with the outer casing material for a battery, which are preferred embodiments of the invention.

A lithium secondary battery of this embodiment is constituted to include at least a positive electrode, a negative electrode, an electrolyte, and an outer casing body for a battery which packages the positive electrode, the negative electrode, and the electrolyte. The outer casing body for a battery is constituted by forming a sheet-shaped outer casing material for a battery into an approximate bag shape. Then, the positive electrode, the negative electrode, and the electrolyte are inserted into the inside of the battery outer casing body. At this time, a separator is disposed between the positive electrode and the negative electrode, as necessary.

The battery outer casing body may also be in the form of a sheet. However, it is preferable that the battery outer casing body be processed into the form of a bag. For example, two sheets of sheet-shaped battery outer casing materials are shaped into the form of a bag by laminating the sheet-shaped battery outer casing materials such that inner layers face each other and then heat-sealing an outer peripheral portion of the sheets. The bag-shaped outer casing body may have an opening portion. The outer casing material for a battery is constituted by laminating an outer layer which includes a heat-resistant resin film, a metal foil layer, and an inner layer which includes a thermoplastic resin film, in this order. Further, in the sheet-shaped battery outer casing material, a concave portion for accommodating the positive electrode, the negative electrode and the electrolyte may also be formed in advance by deep drawing or bulging. The concave portion is a dent when viewed from the inner layer side and the shape thereof can be selected arbitrarily.

As each of the positive electrode and the negative electrode, an electrode composed of a current collector made of metal foil or a metal mesh and an electrode mixture material laminated on the current collector can be used. A positive-electrode active material is contained in an electrode mixture material of the positive electrode and a negative-electrode active material is contained in an electrode mixture material of the negative electrode.

Further, a tab lead as an extraction terminal is joined to each of current collectors of the positive electrode and the negative electrode. The tab lead is joined so that a base end portion in a longitudinal direction of the tab lead is joined to the current collector in the inside of the battery outer casing body, and a leading end portion in the longitudinal direction of the tab lead passes through a heat-seal portion of the battery outer casing body and protrudes to the outside of a battery. That is, an end on one side of the extraction terminal is joined to the positive electrode or the negative electrode, and an end on the other side protrudes to the outside of a battery. In the vicinity of the heat-seal portion of the tab lead, a state is created where the tab lead is sandwiched between the two sheets of sheet-shaped battery outer casing materials, and the inner layer of the battery outer casing material is heat-sealed to the surface of the tab lead.

When manufacturing the lithium secondary battery, the bag-shaped battery outer casing body having an opening portion is prepared and the positive electrode, the negative electrode, the electrolyte, and, as necessary, the separator are inserted into the battery outer casing body. Then, after an electrolytic solution is further injected into the battery outer casing body as necessary, heat-sealing to seal the opening portion so as to pinch the tab lead protruding from the opening portion is performed, whereby the lithium secondary battery with the opening portion hermetically sealed is obtained.

Next, the outer casing material for a battery of this embodiment will be described in detail. The outer casing material for a battery of this embodiment is constituted by laminating the outer layer, the metal foil layer and the inner layer in this order, as described above. Adhesive layers are respectively interposed between the outer layer and the metal foil layer and between the inner layer and the metal foil layer.

(Outer Layer)

The outer layer constituting the outer casing material for a battery is constituted to include at least one or two or more heat-resistant resin films. In the outer layer in a case where it is composed of two or more heat-resistant resin films, it is preferable that the heat-resistant resin films be laminated with an adhesive layer.

The heat-resistant resin film constituting the outer layer plays a role in securing formability of the outer casing material for a battery in a case where the concave portion receiving the positive electrode and the negative electrode is shaped in the outer casing material for a battery. The heat-resistant resin film can be selected as necessary. However, a stretched film of polyamide (nylon) resin or polyester resin is preferably used. Further, it is preferable that the melting point of the heat-resistant resin film constituting the outer layer be higher than the melting point of the thermoplastic resin film constituting the inner layer. In this way, it becomes possible to reliably perform the heat-sealing of the opening portion when manufacturing the lithium secondary battery.

A difference in melting point between the heat-resistant resin film constituting the outer layer and the thermoplastic resin film constituting the inner layer can be selected as necessary. However, for example, a difference in a range of about 30° C. to 100° C. is preferable and a difference in a range of 40° C. to 50° C. is more preferable.

The melting point of the heat-resistant resin film can be selected as necessary. However, a melting point in a range of 100° C. to 300° C. is preferable. For example, melting point in a range of 100° C. to 300° C. is preferable, and melting point in a range of 170° C. to 260° C. is more preferable. In another example, melting point in a range of 100° C. to 200° C. is preferable and a melting point in a range of 130° C. to 160° C. is more preferable.

The thickness of the outer layer can be selected as necessary. However, for example, a thickness in a range of about 5 µm to 100 µm can generally be used, a thickness in a range of about 10 µm to 50 µm is preferable, and a thickness in a range of about 15 µm to 30 µm is more preferable. If the thickness is greater than or equal to 10 µm, there is no lack of stretch of the stretched film when performing the shaping of the outer casing material for a battery, there is no occurrence of necking in the metal foil layer, and shaping defects do not occur. Further, if the thickness is less than or equal to 50 µm, ample formability can be achieved.

(Metal Foil Layer)

The metal foil layer constituting the outer casing material for a battery performs the role of securing the barrier properties of the outer casing material for a battery. The metal foil layer can be selected as necessary, and for example, aluminum foil, stainless steel foil, copper foil, or the like is used. However, it is preferable to use aluminum foil in view of its formability and light weight. As a material of the aluminum foil, a pure aluminum-based material or O material (a soft material), which is an aluminum-iron-based alloy, is preferably used.

The thickness of the metal foil layer can be selected as necessary, and for example, a thickness in a range of 10 µm to 150 µm can generally be used. For securing workability and barrier properties which prevent infiltration of oxygen or moisture into the battery, a thickness in a range of 20 µm to 80 µm is preferable and a thickness in a range of 35 µm to 80 µm is more preferable. If the thickness is greater than or equal to 20 µm, there is no occurrence of fracture of metal foil during the shaping of the outer casing body for a battery, there is also no generation of a pinhole, and infiltration of oxygen or moisture can be prevented. Further, if the thickness is less than or equal to 80 µm, the effect of preventing fracture during shaping or the effect of preventing generation of a pinhole is maintained, the total thickness of the battery outer casing body does not become excessively thick, so that an increase in weight is prevented, and the volumetric energy density of the battery can be improved.

Further, in order to improve adhesiveness with the outer layer and the inner layer or improve corrosion resistance, the metal foil layer may also be subjected to undercoating treatment by a silane-coupling agent, a titanium-coupling agent or the like, or chemical conversion treatment by chromate treatment or the like.

(Inner Layer)

Next, the inner layer constituting the outer casing material for a battery is constituted to include at least a thermoplastic resin film. The inner layer may also be constituted only by the thermoplastic resin film. As the thermoplastic resin film which is used in the inner layer, although it can be selected as necessary, a resin film is preferable which has heat-sealing properties, plays a role in improving chemical resistance to an electrolyte or the like of the lithium secondary battery having strong corrosive properties, and can secure insulation properties between the metal foil layer and the positive electrode or the negative electrode of the lithium secondary battery. For example, an unstretched polyolefin film such as polypropylene or maleic acid-modified polypropylene, or an unstretched film of ethylene-acrylate copolymer, ionomer resin or the like is preferably used.

As the thickness of the inner layer, it can be selected as necessary, and for example, a thickness in a range of about 0.1 µm to 400 µm can generally be used. A thickness in a range of 0.1 µm to 200 µm is preferable, a thickness in a range of 25 µM to 150 µm is more preferable, and a thickness in a range of 50 µm to 100 µm is further preferable. If the thickness is greater than or equal to 0.1 µm, preferably, greater than or equal to 50 µm, heat-sealing strength becomes sufficient, corrosion resistance to an electrolytic solution or the like is improved, and insulation properties between the metal foil layer and the positive electrode or the negative electrode can be enhanced. Further, if the thickness is less than or equal to 200 µm, preferably, less than or equal to 100 µm, there is no obstacle to heat-sealing properties and chemical resistance and the volumetric energy density of the lithium secondary battery can be improved.

In the inner layer, a melt flow rate (MFR) of less than 10 (g/10 minutes) can be preferably used. A melt flow rate (MFR) in a range of greater than or equal to 1 (g/10 minutes) and less than 10 (g/10 minutes) is preferable, a melt flow rate (MFR) in a range of greater than or equal to 1 (g/10 minutes) and less than or equal to 7 (g/10 minutes) is more preferable, and a melt flow rate (MFR) in a range of greater than or equal to 1 (g/10 minutes) and less than or equal to 5 (g/10 minutes) is further preferable. If the melt flow rate (MFR) of the inner layer, that is, the melt flow rate of resin constituting the inner layer is within this range, the amount of thermal deformation of the inner layer becomes small during the heat-sealing of the outer casing material for a battery when manufacturing the lithium secondary battery, whereby the amount of change of the thickness of the inner layer becomes small and high insulation properties between the metal foil layer and the positive electrode or the negative electrode can be maintained. With respect to MFR, numerical values measured by JIS K 7210 can be used. In a case where the melt flow rate is less than 1, there is a case where manufacturing of a film becomes difficult, and in a case where the melt flow rate is greater than or equal to 10, there is a possibility that the problem of excessive collapse during the heat-sealing may arise.

Further, the thermoplastic resin film constituting the inner layer may also be constituted into a single thermoplastic resin layer. However, the thermoplastic resin film constituting the inner layer may also be constituted by laminating a plurality of thermoplastic resin layers. As a specific example of the inner layer which is composed of a plurality of thermoplastic resin layers, for example, a three-layer film composed of an intermediate layer and a pair of covering layers laminated on both sides in the thickness direction of the intermediate layer with the intermediate layer interposed therebetween can be exemplified. It is preferable that the covering layer in this case have a higher melt flow rate than that of the intermediate layer. By making the melt flow rate of the covering layer higher than the melt flow rate of the intermediate layer, the shape of the covering layer follows the shape of a tab lead of the positive electrode or the negative electrode during heat-sealing, so that adherence between the inner layer and the tab lead is increased and the hermetic sealing properties of the lithium secondary battery can be increased. Further, by making the melt flow rate of the intermediate layer lower than the melt flow rate of the covering layer, the intermediate layer is not crushed during the heat-sealing, and thus the thickness of the inner layer is not reduced to a large extent, whereby insulation properties between the tab lead of the positive electrode or the negative electrode and the metal foil layer can be increased.

To give a preferred example, it is preferable that the melt flow rate of the intermediate layer be in a range of 1 to 7 and it is more preferable that the melt flow rate of the intermediate layer be in a range of 1 to 3. It is preferable that the melt flow rate of the covering layer be in a range of 3 to 10 and it is more preferable that the melt flow rate of the covering layer be in a range of 5 to 10.

In addition, if the inner layer is composed of a plurality of layers or films, for example, if the inner layer is a three-layer film, it is preferable that the MFR of the inner layer is in a range of greater than or equal to 1 (g/10 minutes) and less than 10 (g/10 minutes) as the average of a plurality of layers such as three-layers, and it is more preferable if it is in a range of greater than or equal to 1 (g/10 minutes) and less than or equal to 5 (g/10 minutes).

Further, the melting point of the thermoplastic resin film constituting the inner layer, that is, the melting point of thermoplastic resin thereof can be selected as necessary. However, a melting point in a range of 130° C. to 170° C. is preferable, a melting point in a range of 140° C. to 165° C. is more preferable, and a melting point in a range of 160° C. to 165° C. is still more preferable. If the melting point is within this range, the heat resistance of the inner layer is improved, the thickness of the inner layer during the heat-sealing is not reduced, and the insulation properties of the inner layer are improved.

(Adhesive Layer)

The adhesive layers can be respectively disposed as necessary between the outer layer and the metal foil layer and between the inner layer and the metal foil layer in order to bond the outer layer to the metal foil layer and bond the inner layer to the metal foil layer.

As the adhesive layer, an adhesive layer for dry lamination is preferable, and for example, at least one type of adhesive which is selected from a urethane-based adhesive, an acid-modified polyolefin adhesive, a styrene elastomer adhesive, an acrylic adhesive, a silicone-based adhesive, an ether-based adhesive and an ethylene-vinyl acetate-based adhesive can be used.

The thickness of the adhesive layer can be selected as necessary. However, a thickness in a range of 0.1 µm to 10 µm is preferable and a thickness in a range of 1 µm to 5 m is more preferable. If the thickness of the adhesive layer is greater than or equal to 1 µm, adhesive strength is not reduced, and at the inner layer side, the insulation properties of the inner layer can be further enhanced. Further, if the thickness of the adhesive layer is less than or equal to 5 µm, a reduction in adhesive strength can be prevented. If the layer thickness of an adhesive is too thick, since escape of gas that is generated during a curing reaction becomes difficult, it causes generation of cavities due to gas, and as a result, mechanical strength is sometimes reduced. Further, if the layer thickness of an adhesive is too thick, for example, infiltration of moisture that is one of materials promoting curing becomes difficult, so that there is a case where incomplete reaction places are present.

In particular, it is preferable to use adhesive layers made of different materials as the adhesive layer on the outer layer side and the adhesive layer on the inner layer side. For example, as a combination of materials of the adhesive layers, in a case where the outer layer is composed of polyethylene terephthalate (PET) or nylon, it is preferable to use a urethane-based adhesive as an adhesive on the outer layer side, and in a case where the inner layer is composed of polypropylene, it is preferable to use an acrylic adhesive or an acid-modified olefin-based adhesive as an adhesive on the inner layer side.

Adhesive strength between the respective materials and electrolytic solution resistance performance can be given by using adhesive layers made of different materials as the adhesive layer on the outer layer side and the adhesive layer on the inner layer side.

It is preferable that the metal foil layer and the outer layer be laminated with an adhesive layer.

Further, the inner layer and the metal foil layer may be laminated with an adhesive layer, similarly to the case of the outer layer. However, the inner layer and the metal foil layer may also be bonded to each other by heat lamination using thermally adhesive resin having excellent chemical resistance and electrolytic solution resistance. In such a case, even better adherence is obtained between the inner layer and the metal foil layer. In this case, for example, heat lamination can be performed by extruding thermally adhesive resin such as maleic anhydride-modified polypropylene modified by maleic anhydride or the like between the metal foil layer and the inner layer and by subsequent molding. At this time, a modified thermally-adhesive resin layer, which is a single layer, may be used. However, a plurality of resin layers may also be used instead of such a single resin layer. For example, a method having an advantage in terms of costs is provided, wherein polyolefin which is the same type of the thermoplastic resin film of the inner layer is used, and the polyolefin may be, for example, a coextruded resin (a multi-layer) wherein polypropylene and modified polypropylene resin are coextruded. The polyolefin such as the coextruded resin is provided between the metal foil layer and the inner layer, and due to heat which is applied thereto, heat-lamination is performed such that the metal foil layer and the modified polypropylene resin are adhered to each other and the inner layer and the polypropylene are adhered to each other.

The insulation properties of the inner layer of the battery outer casing material can be evaluated by the following evaluation method.

First, the above-described lithium secondary battery is manufactured and the outer layer of the outer casing body for a battery of the lithium secondary battery is partially removed to expose the metal foil layer. It is preferable that a position where the metal foil layer is exposed be a position away from the tab lead as much as possible. Subsequently, a conducting wire is connected to the exposed metal foil layer and a conducting wire is also connected to the tab lead of either the positive electrode or the negative electrode. In addition, instead of exposing the metal foil layer by removal, a configuration is also acceptable in which an electrically-conductive tape is attached to an exposed end face of the metal foil layer and a conducting wire is connected to the electrically-conductive tape. Then, a power supply and a resistance-measuring instrument are inserted between these conducting wires. Then, voltage is applied between the metal foil layer and the tab lead through the conducting wires from the power supply, a resistance value between the metal foil layer and the tab lead at this time is measured by the resistance-measuring instrument, and the insulation properties of the inner layer of the outer casing material for a battery is evaluated by the obtained resistance value.

It is preferable that the outer casing material for a battery of this embodiment have an insulation resistance value of $1 \times 10^6 \Omega$ or more when direct-current voltage in a range of 5 volts to 50 volts is applied by the above-described method.

In addition, when evaluating the insulation properties of the inner layer of the battery outer casing material, a test cell can also be used in which a tab lead is attached to the outer casing body for a battery instead of the above-described lithium secondary battery, and the inside of the battery outer casing body is filled with an electrolytic solution.

Manufacturing examples of the outer casing material for a battery of this embodiment will be given.

First, an adhesive for dry lamination is applied to the surface of the outer layer or the metal foil layer and a solvent contained in the adhesive for dry lamination is volatilized. Then, a dry-laminated film is fabricated by dry-laminating the outer layer and the metal foil layer.

Next, another adhesive for dry lamination is applied to the surface of the metal foil layer of the dry-laminated film or the inner layer, and a solvent contained in the adhesive for dry lamination is volatilized. Then, the dry-laminated film and the inner layer are dry-laminated. In this way, the outer casing material for a battery of this embodiment can be manufactured.

Since the outer casing material for a battery of this embodiment is manufactured by a dry lamination method using an adhesive, in particular, when selecting a material of the inner layer, there is no need to consider adherence with the metal foil layer, and therefore a material having a relatively low melt flow rate (MFR) in a range of greater than or equal to 1 (g/10 minutes) and less than 10 (g/10 minutes) can be selected.

According to the outer casing material for a battery of this embodiment, since the melt flow rate (MFR) of the inner layer is in a range of greater than or equal to 1 and less than 10, when the outer casing material for a battery is heat-sealed, the amount of reduction of the thickness of the inner layer becomes small, so that the insulation properties of the inner layer can be improved.

Further, since the melt flow rate of the covering layer is made higher than that of the intermediate layer, the heat-seal performance of the inner layer can be improved and high insulation properties of the inner layer can also be maintained, in a case where the inner layer is composed of an intermediate layer and a pair of covering layers laminated on both sides in the thickness direction of the intermediate layer so that the intermediate layer is interposed therebetween.

In addition, according to the lithium secondary battery of this embodiment, since the lithium secondary battery is provided with the above-described outer casing material for a battery, generation of an internal short-circuit through the metal foil layer can be suppressed.

According to the present invention, an outer casing material for a battery having excellent insulation properties and a lithium secondary battery provided with such an outer casing material for a battery can be provided.

EXAMPLES

Example 1

An outer layer film was fabricated by dry-laminating a stretched polyethylene terephthalate film (manufactured by Toray Industries, Inc., general-purpose product) having a thickness of 12 μm and a stretched polyamide film (BONYL RX manufactured by Kohjin Co., Ltd.) having a thickness of 15 μm with a two-component urethane-based adhesive layer having a thickness of 3 μm interposed therebetween.

Subsequently, an outer layer-metal foil layer film was fabricated by dry-laminating the obtained outer layer film and aluminum foil (a material according to JIS standard A8079H-O) having a thickness of 40 μm with a two-component urethane-based adhesive layer having a thickness of 3 μm interposed therebetween under the conditions of speed: 80 m/min and roll temperature: 80° C.

Subsequently, as an inner layer, an unstretched polypropylene film having a thickness of 90 μm, which was formed with a resin (PL500A manufactured by Sun Aroma Co., Ltd.) having MFR of 4 (g/10 minutes) by using a T-die shaping method, was prepared.

An outer casing body for a battery of Example 1 was manufactured by dry-laminating the inner layer and the outer layer-metal foil layer film with a two-component acrylic adhesive layer having a thickness of 1.5 m interposed therebetween under the conditions of speed: 80 m/min and roll temperature: 80° C.

Example 2

An outer casing body for a battery of Example 2 was manufactured in the same manner as in Example 1 except that the melt flow rate of the inner layer was set to be 1 (g/10 minutes). An unstretched polypropylene film (thickness: 90 μm) having a melt flow rate of 1 (g/10 minutes) was used as the inner layer. PL400A (resin) manufactured by Sun Aroma Co., Ltd. was used to form the unstretched polypropylene film.

Example 3

An outer casing body for a battery of Example 3 was manufactured in the same manner as in Example 1 except that the melt flow rate of the inner layer was set to be 5 (g/10 minutes). An unstretched polypropylene film (thickness: 90 μm) having a melt flow rate of 5 (g/10 minutes) was used as the inner layer. 5C30F (resin) manufactured by Sun Aroma Co., Ltd. was used to form the unstretched polypropylene film.

Example 4

An outer casing body for a battery of Example 4 was manufactured in the same manner as in Example 1 except that the melt flow rate of the inner layer was set to be 9 (g/10 minutes). An unstretched polypropylene film (thickness: 90 μm) having a melt flow rate of 9 (g/10 minutes) was used as the inner layer. PC630S (resin) manufactured by Sun Aroma Co., Ltd. was used to form the unstretched polypropylene film.

Example 5

An outer casing body for a battery of Example 5 was manufactured so that a film (thickness: 90 μm) having the three-layered structure was used as the inner layer. Concretely, the inner layer was formed by laminating a layer having a melt flow rate of 10 (g/10 minutes), a layer having a melt flow rate of 1 (g/10 minutes) and a layer having a melt flow rate of 10 (g/10 minutes) in this order. The average value of a melt flow rate of the inner layer was 4 (g/10 minutes) in total. The outer casing body for a battery of Example 5 was manufactured in the same manner as in Example 1 except for the aforementioned conditions. The aforementioned film was a trial product manufactured by Okamoto Industries, Inc.

Comparative Example 1

An outer casing body for a battery of Comparative Example 1 was manufactured in the same manner as in Example 1 except that the melt flow rate of the inner layer was set to be 10 (g/10 minutes). As an unstretched polypropylene film (thickness: 90 μm) having a melt flow rate of 10 (g/10 minutes) was used as the inner layer. PM761A (resin) manufactured by Sun Aroma Co., Ltd. was used to form the unstretched polypropylene film.

Comparative Example 2

An outer casing body for a battery of Comparative Example 2 was manufactured in the same manner as in Example 1 except that the melt flow rate of the inner layer was set to be 12 (g/10 minutes). An unstretched polypropylene film (thickness: 90 μm) having a melt flow rate of 12 (g/10 minutes) was used as the inner layer. PL801C (resin) manufactured by Sun Aroma Co., Ltd. was used to form the unstretched polypropylene film.

Comparative Example 3

An outer layer film was fabricated by dry-laminating a stretched polyethylene terephthalate film (manufactured by Toray Industries, Inc., general-purpose product) having a thickness of 12 μm and a stretched polyamide film (BONYL RX manufactured by Kohjin Co., Ltd.) having a thickness of 15 μm with a two-component urethane-based adhesive layer having a thickness of 3 μm.

Subsequently, an outer layer-metal foil layer film was fabricated by dry-laminating the obtained outer layer film and aluminum foil (a material according to JIS standard A8079H-O) having a thickness of 40 μm with a two-component acrylic adhesive layer having a thickness of 3 μm in the same conditions as in Example 1.

Subsequently, as an inner layer, an unstretched polypropylene film having a thickness of 90 μm and a melt flow rate of 10 (g/10 minutes) was prepared, and an outer casing body for a battery of Comparative Example 3 was manufactured by sand-laminating the inner layer, the outer layer-metal foil layer film, and maleic anhydride-modified polypropylene under the extrusion conditions.

As a stretched polypropylene film having a melt flow rate of 10 (g/10 minutes), PM761A manufactured by Sun Aroma Co., Ltd. was used.

Comparative Example 4

An outer casing body for a battery of Comparative Example 4 was manufactured in the same manner as in Comparative Example 3 except that the melt flow rate of the inner layer was set to be 12 (g/10 minutes).

An unstretched polypropylene film (thickness: 90 μm) having a melt flow rate of 12 (g/10 minutes) was used as the inner layer. PL801C (resin) manufactured by Sun Aroma Co., Ltd. was used to form the unstretched polypropylene film.

(Evaluation Method)

(1) Preparation of Test Cell for Insulation Evaluation

Figure 1:
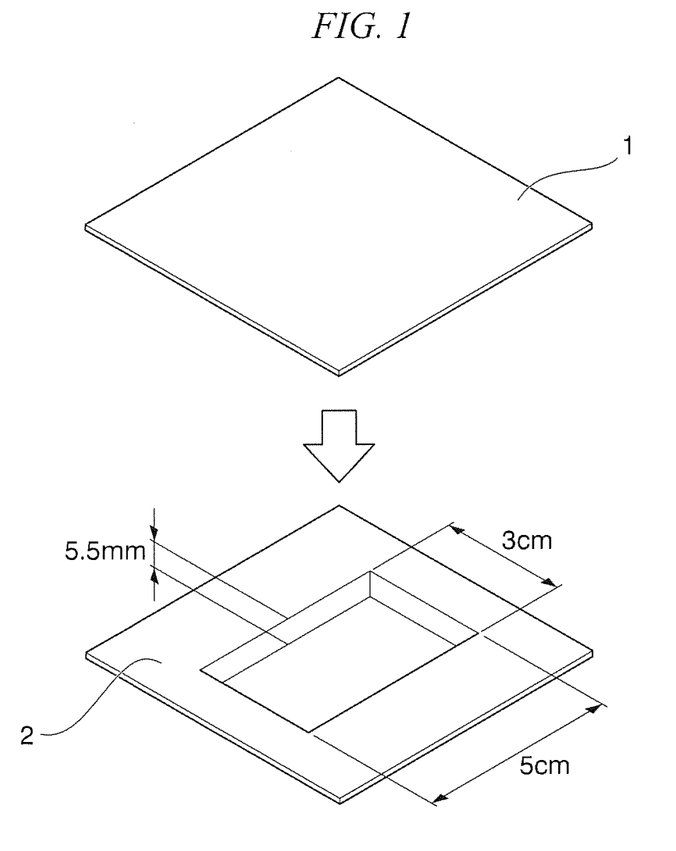
FIG. 1 is a schematic diagram showing a deep drawing process of a battery outer casing material in Examples.

As shown in FIG. 1, formation of a concave portion, that is, deep drawing of a size of 5 cm×3.25 cm was performed on an outer casing material for a battery 1 of each of Examples 1 to 5 and Comparative Examples 1 to 4 described above. The depth of the deep drawing was set to be 5.5 mm and trimming of a periphery was performed so as to obtain a size of 9.5 cm×6.5 cm.

Figure 2:
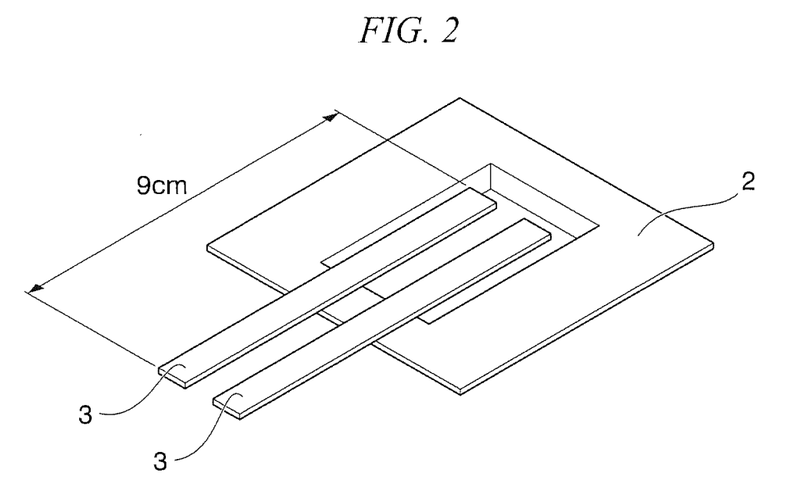
FIG. 2 is a schematic diagram showing a manufacturing process of a battery outer casing body of a lithium secondary battery in Examples.
Figure 3:
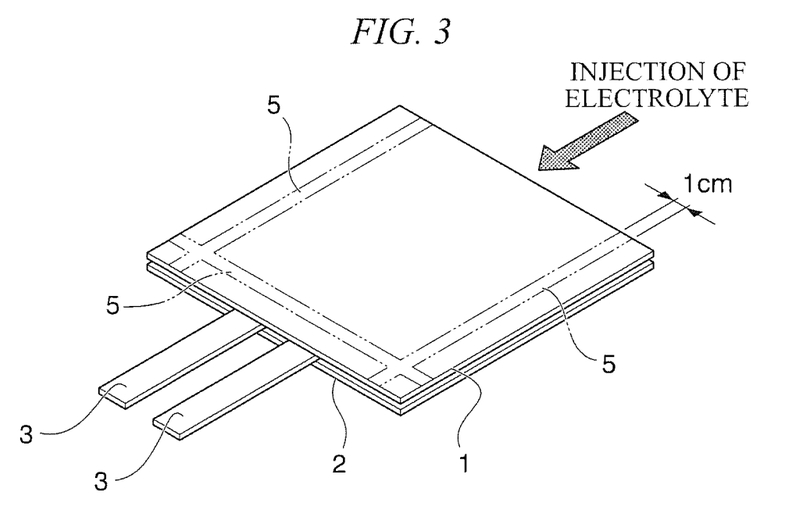
FIG. 3 is a schematic diagram showing a manufacturing process of a test cell for insulation evaluation in Examples.

Next, using the processed outer casing material for a battery 2 of Examples 1 to 5 and Comparative Examples 1 to 4, which had been processed as described above, and the unprocessed outer casing material for a battery of Examples 1 to 5 and Comparative Examples 1 to 4, which had not been processed, an outer casing body for a battery 4 as shown in FIG. 3 was manufactured such that the inner layers are located inside, tab leads 3 (length of each tab lead: 9 cm) manufactured by Nets Inc, was put between the layers as shown in FIG. 2, and heat-sealing was performed subsequently for the materials.

As a heat sealer, TP-701-A manufactured by Tester Sangyo Co., Ltd. was used. The heat-sealing conditions were set to be 200° C., 0.2 MPa and 6 seconds. As shown in FIG. 3, the places of sealing 5 were set to be places distant by 1 cm from the respective shaped places. In addition, since polypropylene itself that is the film on the inner layer side has thermal welding properties, there is no need to newly prepare thermal adhesion resin at the time of the heat-sealing.

Figure 4:
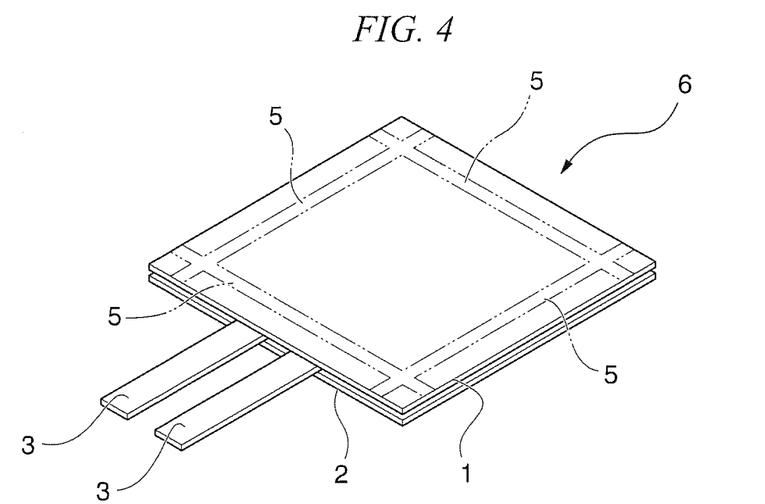
FIG. 4 is a schematic diagram showing a manufacturing process of the test cell for insulation evaluation in Examples.

After the battery outer casing body was prepared by performing sealing work on three sides of the outer casing materials for a battery, 7.5 ml of an electrolytic solution manufactured by Kishida Chemical Co., Ltd. was injected into the casing body. As components of the electrolytic solution, $LiPF_6$ having a concentration of 1 M was set to be a solute, and a mixed solution of ethylene carbonate:diethyl carbonate=1:1 (volume ratio) was set to be a solvent. After the injection of the electrolytic solution, a test cell 6 was manufactured by performing heat-sealing of the fourth side of the casing body, thereby enclosing the electrolytic solution in the battery outer casing body 4, as shown in FIG. 4.

After the electrolytic solution was enclosed, a carbon tape for SEM manufactured by Nisshin EM Corporation was attached to a lower portion of the test cell 6. This was performed for the purpose of increasing a contact surface with a probe of a measuring device in order to perform stable measurement.

Figure 5:
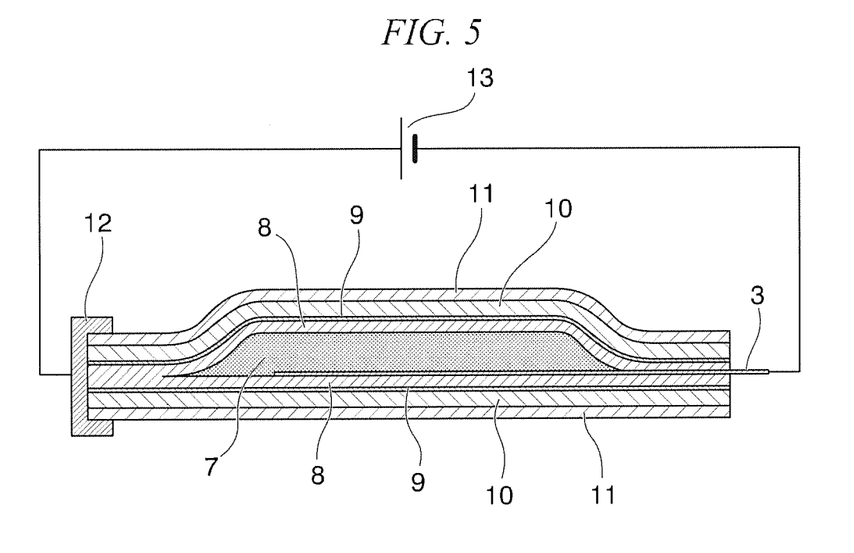
FIG. 5 is a schematic diagram showing an insulation property evaluation method in Example 1 and Comparative Examples 1 and 2.
Figure 6:
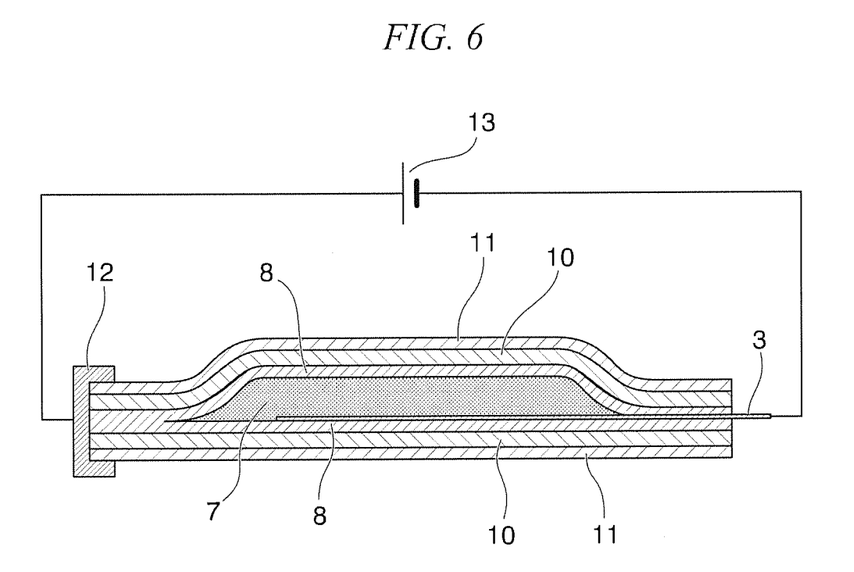
FIG. 6 is a schematic diagram showing an insulation property evaluation method in Comparative Examples 3 and 4.

In addition, in the cases of from Examples 1 to Comparative Example 2, as shown in FIG. 5, an internal circuit is structured with a combination of the tab lead 3/an electrolytic solution 7/an inner layer 8/a dry lamination adhesive layer 9/a metal foil layer 10/an outer layer 11/a carbon tape 12. In contrast, in the cases of Comparative Examples 3 and 4, as shown in FIG. 6, an internal circuit is structured with a combination of the tab lead 3/the electrolytic solution 7/the inner layer 8/the metal foil layer 10/the outer layer 11/the carbon tape 12. In addition, reference numeral 13 denotes an insulation resistance tester.

Five test cells for insulation evaluation shown in FIGS. 5 and 6 were manufactured for each of Example 1 to Comparative Example 4.

(2) Insulation Evaluation

Figure 7:
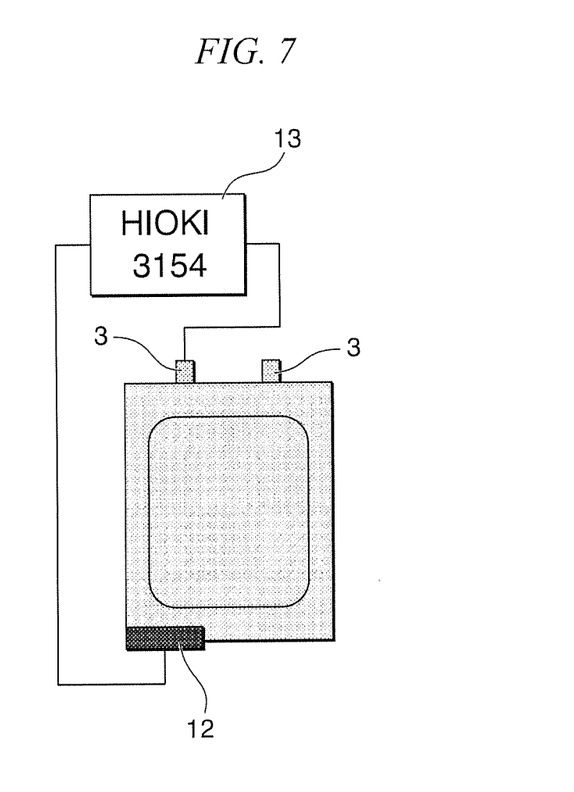
FIG. 7 is a schematic diagram showing an insulation property evaluation method in Example 1 and Comparative Examples 1 to 4.

Insulation resistance tester 3154 manufactured by Hioki E.E. Corporation was used in an insulation test. A measurement range was set to be 200 MΩ, an applied voltage was set to be 25 V, and an application time was set to be 10 seconds. Measurement was performed in a state where probes respectively are in contact with the tab lead and the carbon tape, as shown in FIG. 7. The results are shown in Tables 1 and 2.

TABLE 1

| | MFR of inner layer (g/10 min.) | Thickness of inner layer (μm) | Joining of inner layer and metal foil layer | n = 5 | Insulation resistance value |
|---|---|---|---|---|---|
| Example 1 | 4 | 90 | Dry lamination | 1 | Greater than or equal to measurement upper limit (>200 MΩ) |
| | | | | 2 | Greater than or equal to measurement upper limit (>200 MΩ) |
| | | | | 3 | Greater than or equal to measurement upper limit (>200 MΩ) |
| | | | | 4 | Greater than or equal to measurement upper limit (>200 MΩ) |
| | | | | 5 | 80 MΩ |

TABLE 1-continued

|  | MFR of inner layer (g/10 min.) | Thickness of inner layer (μm) | Joining of inner layer and metal foil layer | n = 5 | Insulation resistance value |
|---|---|---|---|---|---|
| Example 2 | 1 | 90 | Dry lamination | 1 | 100 MΩ |
|  |  |  |  | 2 | Greater than or equal to measurement upper limit (>200 MΩ) |
|  |  |  |  | 3 | Greater than or equal to measurement upper limit (>200 MΩ) |
|  |  |  |  | 4 | 60 MΩ |
|  |  |  |  | 5 | Greater than or equal to measurement upper limit (>200 MΩ) |
| Example 3 | 5 | 90 | Dry lamination | 1 | Greater than or equal to measurement upper limit (>200 MΩ) |
|  |  |  |  | 2 | 50 MΩ |
|  |  |  |  | 3 | 30 MΩ |
|  |  |  |  | 4 | Greater than or equal to measurement upper limit (>200 MΩ) |
|  |  |  |  | 5 | 20 MΩ |
| Example 4 | 9 | 90 | Dry lamination | 1 | 10 MΩ |
|  |  |  |  | 2 | 21 MΩ |
|  |  |  |  | 3 | 30 MΩ |
|  |  |  |  | 4 | Greater than or equal to measurement upper limit (>200 MΩ) |
|  |  |  |  | 5 | 15 MΩ |
| Example 5 | 4 (Average) | 90 | Dry lamination | 1 | >200 MΩ |
|  |  |  |  | 2 | >200 MΩ |
|  |  |  |  | 3 | >200 MΩ |
|  |  |  |  | 4 | >200 MΩ |
|  |  |  |  | 5 | >200 MΩ |

TABLE 2

|  | MFR of inner layer (g/10 min.) | Thickness of inner layer (μm) | Joining of inner layer and metal foil layer | n = 5 | Insulation resistance |
|---|---|---|---|---|---|
| Comparative Example 1 | 10 | 90 | Dry lamination | 1 | 1.2 MΩ |
|  |  |  |  | 2 | 1.5 MΩ |
|  |  |  |  | 3 | 3.0 MΩ |
|  |  |  |  | 4 | 4.1 MΩ |
|  |  |  |  | 5 | 3.5 MΩ |
| Comparative Example 2 | 12 | 90 | Dry lamination | 1 | 0.9 MΩ |
|  |  |  |  | 2 | 1.0 MΩ |
|  |  |  |  | 3 | 1.5 MΩ |
|  |  |  |  | 4 | 0.8 MΩ |
|  |  |  |  | 5 | 1.2 MΩ |
| Comparative Example 3 | 10 | 90 | Heat lamination | 1 | 0.5 MΩ |
|  |  |  |  | 2 | 0.5 MΩ |
|  |  |  |  | 3 | 0.4 MΩ |
|  |  |  |  | 4 | 0.5 MΩ |
|  |  |  |  | 5 | 0.2 MΩ |
| Comparative Example 4 | 12 | 90 | Heat lamination | 1 | 0.2 MΩ |
|  |  |  |  | 2 | 0.2 MΩ |
|  |  |  |  | 3 | 0.2 MΩ |
|  |  |  |  | 4 | 0.2 MΩ |
|  |  |  |  | 5 | 0.2 MΩ |

(Results)

Examples 1 to 5 showed high resistances. In Example 1 in which the amount of thermal deformation of the inner layer was small, resistance values of 200 MΩ or more were shown. In Comparative Examples in which the amount of thermal deformation was large, resistance values of 0.8 to 4.1 MΩ were shown in Comparative Examples 1 and 2, and resistance values of 0.5 MΩ or less were shown in Comparative Examples 3 and 4.

This difference is presumed to depend on the heat resistance and the layer thickness of a sealant layer acting as an insulating layer.

In a case where the inner layers are bonded to each other by a heat lamination method, as in Comparative Examples 3 and 4, there is a need to heat the inner layers to a temperature higher than or equal to a melting point thereof. For this reason, the inner layer capable of being used in heat lamination is limited to a layer having a melting point of less than a certain temperature, and a melt flow rate exceeding a certain value.

In contrast, in a case where the inner layers are bonded to each other by dry lamination processing, the inner layer depends only on an adhesive and compatibility with the metal foil layer, and is not subjected to a limitation by a melting point or a melt flow rate.

With respect to Examples 1 to 5 and Comparative Examples 1 to 4, when the thickness of the inner layer at a place where the inner layers had been bonded to each other was measured, the results as shown in Table 3 were obtained. The thickness of the inner layer at the time of manufacturing of the battery outer casing body is 90 μm. Accordingly, it is assumed that, if the inner layer is not thermally deformed, the thickness of the inner layers at a place where the inner layers are bonded to each other should become 180 μm.

As shown in Table 3, in Example 1, the thickness of the inner layers at a place where the inner layers are bonded to each other was 180 μm. However, in Comparative Examples 1 to 4, the thickness was reduced to a large extent. It is presumed that a reduction in the thickness of the inner layers causes a decrease in insulation properties.

TABLE 3

|  | MFR | Thickness of inner layers at a place where the inner layers are bonded to each other |
|---|---|---|
| Example 1 | 4 | 180 μm |
| Example 2 | 1 | 180 μm |
| Example 3 | 5 | 170 μm |
| Example 4 | 9 | 155 μm |
| Example 5 | 4 | 180 μm |
| Comparative Example 1 | 10 | 140 μm |
| Comparative Example 2 | 12 | 120 μm |
| Comparative Example 3 | 10 | 130 μm |
| Comparative Example 4 | 12 | 115 μm |

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:

1. An outer casing material for a battery, wherein the casing material is formed by laminating an outer layer which includes a heat-resistant resin film, a metal foil layer and an inner layer which includes a thermoplastic resin film, wherein:
   the melting point of the heat-resistant resin film constituting the outer layer is higher than the melting point of the thermoplastic resin film constituting the inner layer;
   an adhesive layer for dry lamination having a thickness in a range of 0.1 μm to 10 μm between the outer layer and the metal foil layer and between the inner layer and the metal foil layer, and the adhesive layer is made with at least one selected from: a urethane-based adhesive, an acid-modified polyolefin adhesive, a styrene elastomer adhesive, an acrylic adhesive, a silicone-based adhesive, an ether-based adhesive and an ethylene-vinyl acetate-based adhesive;
   the inner layer consists of an intermediate layer and a pair of covering layers laminated on both sides in the thickness direction of the intermediate layer so that the intermediate layer is sandwiched by the covering layers;
   a melt flow rate of the covering layer is higher than a melt flow rate of the intermediate layer; and
   the melt flow rate of the inner layer is greater than or equal to 1 and less than or equal to 4 g/10 min as the average of melt flow rate of the three layers included in the inner layer.

2. The outer casing material for a battery according to claim 1, wherein the thickness of the inner layer is in a range of 0.1 μm to 200 μm.

3. The outer casing material for a battery according to claim 1, wherein the inner layer is made of polyolefin.

4. The outer casing material for a battery according to claim 1, wherein the thickness of the inner layer is in a range of 50 μm to 100 μm.

5. The outer casing material for a battery according to claim 1, wherein the outer layer and the inner layer are bonded to the metal foil layer through adhesive layers.

6. The outer casing material for a battery according to claim 1, wherein a concave portion is formed in the outer casing material by deep drawing or bulging.

7. The outer casing material for a battery according to claim 1, wherein the melt flow rate of the inner layer is greater than 1 and less than or equal to 4 g/10 min.

8. The outer casing material for a battery according to claim 1, wherein the inner layer is an unstretched film of polypropylene, maleic acid-modified polypropylene, ethylene-acrylate copolymer, or ionomer resin.

9. The outer casing material for a battery according to claim 1, wherein the melting point of the thermoplastic resin film of the inner layer is in a range of 130° C. to 170° C.

10. The outer casing material for a battery according to claim 1, wherein the inner layer and the metal foil layer are bonded to each other by heat lamination using thermally adhesive resin which includes maleic anhydride-modified polypropylene.

11. An outer casing material for a battery, wherein the casing material is formed by laminating an outer layer which includes a heat-resistant resin film, a metal foil layer and an inner layer which includes a thermoplastic resin film, wherein
   the melting point of the heat-resistant resin film constituting the outer layer is higher than the melting point of the thermoplastic resin film constituting the inner layer;
   The inner layer and the metal foil layer have been bonded to each other by heat-lamination with two-layer type coextruded resin which consists of polypropylene and modified polypropylene resin, so that the metal foil layer and the modified polypropylene resin are adhered to each other, and the inner layer and the polypropylene are adhered to each other;
   the inner layer consists of an intermediate layer and a pair of covering layers laminated on both sides in the thickness direction of the intermediate layer so that the intermediate layer is sandwiched by the covering layers;
   a melt flow rate of the covering layer is higher than a melt flow rate of the intermediate layer; and
   the melt flow rate of the inner layer is greater than or equal to 1 and less than or equal to 4 g/10 min as the average of melt flow rate of the three layers included in the inner layer.

12. The outer casing material for a battery according to claim 1, wherein the outer layer is PET or nylon, an adhesive provided between the outer layer and the metal foil layer is a urethane-based adhesive, the inner layer is polypropylene, and an adhesive provided between the inner layer and the metal foil layer is an acrylic adhesive or an acid-modified olefin-based adhesive.

13. The outer casing material for a battery according to claim 1, wherein the outer casing material is
   (i) a sheet-shaped outer casing material, or
   (ii) a bag-shaped outer casing material having an opening portion wherein two sheets of the outer casing materials are laminated such that inner layers of the sheets face each other and an outer peripheral portion of the sheets is heat-sealed.

14. The outer casing material for a battery according to claim 1, wherein the outer layer has at least one of the following features (i) to (ii),
  (i) the outer layer is a stretched film of polyamide resin or polyester resin,
  (ii) the thickness of the outer layer is in a range of 10 μm to 50 μm.

15. The outer casing material for a battery according to claim 1, wherein the metal foil layer has at least one of the following features (i) and (ii),
  (i) the metal foil layer is aluminum foil, stainless steel foil, or copper foil, and
  (ii) the thickness of the metal foil layer is in a range of 20 μm to 80 μm.

16. A lithium secondary battery comprising the outer casing material for a battery according to claim 1.

17. The lithium secondary battery according to claim 16, comprising: a positive electrode, a negative electrode and an electrolyte which are packaged in the inside of an outer casing body for a battery, which is formed with the outer casing material; and an extraction terminal in which an end on one side is joined to the positive electrode or the negative electrode and an end on the other side protrudes to the outside of the battery.

18. The outer casing material for a battery according to claim 1, wherein the inner layer is an innermost layer.

19. The lithium secondary battery according to claim 17, wherein the extraction terminal is sandwiched between a set of the inner layers so that the extraction terminal directly contacts with the inner layers by thermal sealing.

* * * * *